United States Patent [19]

Wu

[11] Patent Number: 5,395,447
[45] Date of Patent: Mar. 7, 1995

[54] ADJUSTABLE DOUBLE-ROLLER OIL FEEDER

[76] Inventor: Ching C. Wu, 8F, No. 62, Sec. 4, Chin Chan Road, Sangchung, Taiwan, Prov. of China

[21] Appl. No.: 146,970

[22] Filed: Nov. 3, 1993

[51] Int. Cl.$^6$ .............................................. B05C 1/00
[52] U.S. Cl. ...................................... 118/227; 118/249
[58] Field of Search .............. 118/227, 249, 255, 259, 118/266

[56] References Cited

U.S. PATENT DOCUMENTS

| | | | |
|---|---|---|---|
| 2,870,737 | 1/1959 | Byrnes | 118/227 |
| 2,998,327 | 8/1961 | Catallo | 118/227 |
| 3,695,225 | 10/1972 | Pape et al. | 118/239 |
| 3,710,469 | 1/1973 | Kitazawa | 29/125 |
| 3,805,738 | 4/1974 | Kitazawa | 118/227 |
| 4,384,544 | 5/1983 | Weishew | 118/224 |
| 4,653,303 | 3/1987 | Richard | 72/236 |

FOREIGN PATENT DOCUMENTS 9100150  1/1991  WIPO .

*Primary Examiner*—Nina Bhat
*Attorney, Agent, or Firm*—Merchant, Gould, Smith, Edell, Welter & Schmidt

[57] ABSTRACT

An adjustable double-roller oil feeder includes a top frame having oil drain holes with respective flow rate regulating valves, a first roller supported on two opposite bearing blocks by bearings and disposed below a top frame to receive the lubricating oil from the oil drain holes of the top frame, a bottom frame, a second roller supported on springs inside a longitudinal trough to receive the lubricating oil from an oil intake pipe, the second roller comprised of a master oil filling rod, two oil pipes connected between the two opposite ends of the second roller and the two opposite ends of the oil guide hole through the top frame for allowing the oil feeder to be tilted sideways, and curved oil guide tubes optionally fastened to the oil drain holes for guiding the lubricating oil to the first roller as the oil feeder is tilted backwards.

8 Claims, 7 Drawing Sheets

ADJUSTABLE DOUBLE-ROLLER OIL FEEDER

BACKGROUND OF THE INVENTION

The present invention relates to an adjustable double-roller oil feeder which can be installed in a horizontal position, or tilted sideways by changing the position of the oil intake pipe thereof, or tilted backwards by attaching curved oil guide tubes to the oil drain holes on the transverse top frame thereof for guiding the lubricating oil to the first roller thereof. Springs are installed to support the rollers so that shocks are eliminated or lessened as the workpiece passes through the gap between the first and second rollers of the oil feeder.

A punching metal-working machine generally has an oil feeder to apply a lubricating oil to the workpiece being processed so as to reduce the working temperature and prolong the service life of the machine. There is a double-roller type oil feeder disclosed for this purpose. This double-roller type oil feeder, as shown in FIG. 7, comprises an upper roller (2A) having a center tube (21A), a lower roller (3A) having a center tube (31A), an oil tank (11A) controlled by a control valve (12A) to supply a lubricating oil to the center tubes (21A;31A) of the upper and lower rollers (2A;3A) through an oil supply pipe (1A). The center tubes (21A;31A) of the upper and lower rollers (2A;3A) have respective oil outlets (211A;311A) of a uniform size, each being received in a respective sleeve (22A;32A). The sleeves (22A;32A) have equally spaced oil drain holes (221A;321A), each being covered with a respective cylindrical covering layer (23A;33A). The cylindrical covering layer (23A;33A) is respectively made of fibers, sponge, etc. During the operation of the oil feeder, the workpiece is moved through the gap between the upper roller (2A) and the lower roller (3A). The lubricating oil which is guided into the center tubes (21A;31A) flows out of the oil outlets (211A;311A) and the oil drain holes (221A;321A) to permeate the covering layers (23A;33A), and therefore the lubricating oil is covered over the two opposite sides of the workpiece to reduce the working temperature as the workpiece passes through the upper and lower rollers (2A;3A). This structure of double-roller oil feeder is still not satisfactory in function. The drawbacks of this structure of double-roller oil feeder are numerous and outlined hereinafter.

i) The lubricating oil can not be uniformly applied to the covering layers (23A;33A). As the lubricating oil is viscous, it cannot quickly fill up the inside space of the center tube (21A;31A). Because the oil outlets (211A;311A) are equal in diameter, much volume of the lubricating oil flows out of the oil outlets near the oil input side, and less volume of the lubricating oil flows out of the oil outlets far from the oil input side. Because the oil drain holes (221A;321A) are equally spaced on the sleeves (22A;32A), the lubricating oil cannot be uniformly distributed over the inside wall of the covering layers (23A;33A), and less volume of the lubricating oil is applied to the area between either two oil drain holes (221A;321A).

ii) The volume of the supply of the lubricating oil through either oil outlets (211A;311A) cannot be respectively regulated. The regulation of the supply of the lubricating oil is controlled by the control valve (12A). However, the control valve (12A) can only regulate the total volume of the supply of the lubricating oil. In case the oil supply pipe (1A) is partially blocked, the intake volume of the lubricating oil for applying to the covering layers (23A;33A) becomes unstable, and there workpiece cannot be uniformly covered with the lubricating oil.

iii) The oil feeder must be installed in a horizontal position so that the lubricating oil can be smoothly applied to the workpiece. If the oil feeder is installed in a tilted position, the lubricating oil will be accumulated in the rollers (2A;3A), and the application of the lubricating oil to the workpiece will become unstable.

SUMMARY OF THE INVENTION

The present invention has been accomplished to provide an adjustable double-roller oil feeder which eliminates the aforesaid drawbacks. According to one aspect of the present invention, the lubricating oil is delivered from an oil intake pipe to the oil guide hole on a transverse top frame, and then the lubricating oil drops from drain holes on the transverse top frame to the first (upper) roller, and the drain holes are respectively controlled by a respective flow rate regulating valve. Therefore the oil flow rate through each drain hole can be respectively regulated.

According to still another aspect of the present invention, the second roller is comprised of a master oil filling rod and an auxiliary oil filling rod longitudinally aligned within a sleeve. The master oil filling rod is made of an elongated tube with one end thereof opened and an opposite end thereof closed. The master oil filling rod has a plurality of oil filling holes made in different sizes and properly arranged along the length with relatively smaller oil filling holes disposed closer toward the open end of the master oil filling rod and relatively bigger oil filling holes disposed closer toward the close end of the master oil filling rod, and therefore the lubricating oil can be uniformly distributed over the covering layer of the second roller.

According to another aspect of the present invention, two oil pipes are respectively connected between the two opposite ends of the second (lower) roller and the two opposite ends of the oil guide hole on the transverse top frame, and the oil filling holes on the master oil filling rod of the second roller are made in different sizes, and therefore the oil feeder can be tilted sideways without affecting the uniform supply of the lubricating oil.

According to still another aspect of the present invention, curved oil guide tubes are provided for fastening to the drain holes on the transverse top frame at the bottom for permitting the oil feeder to be disposed in a tilted position sloping backwards.

According to still another aspect, the sleeve of the second roller has oil holes equally spaced along the length and alternatively arranged on two opposite sides and disposed perpendicular to one another, therefore the lubricating oil can be smoothly guided out of the oil holes to uniformly apply to the covering layer of the second roller as the sleeve is turned during the operation of the oil feeder.

According to still another aspect of the present invention, compression springs are installed in a longitudinal trough of the bottom frame of the oil feeder to support the second roller, and therefore shocks can be eliminated or lessened as the workpiece passes through the gap between the first roller and the second roller.

According to still another aspect of the present invention, friction rings are respectively mounted around the felt covering layer of the first roller as well as the second roller to protect the respective felt covering layer, and therefore the first and second rollers are durable in use.

DETAILED DESCRIPTION OF THE PREFERRED EMBODIMENT

Figure 1:
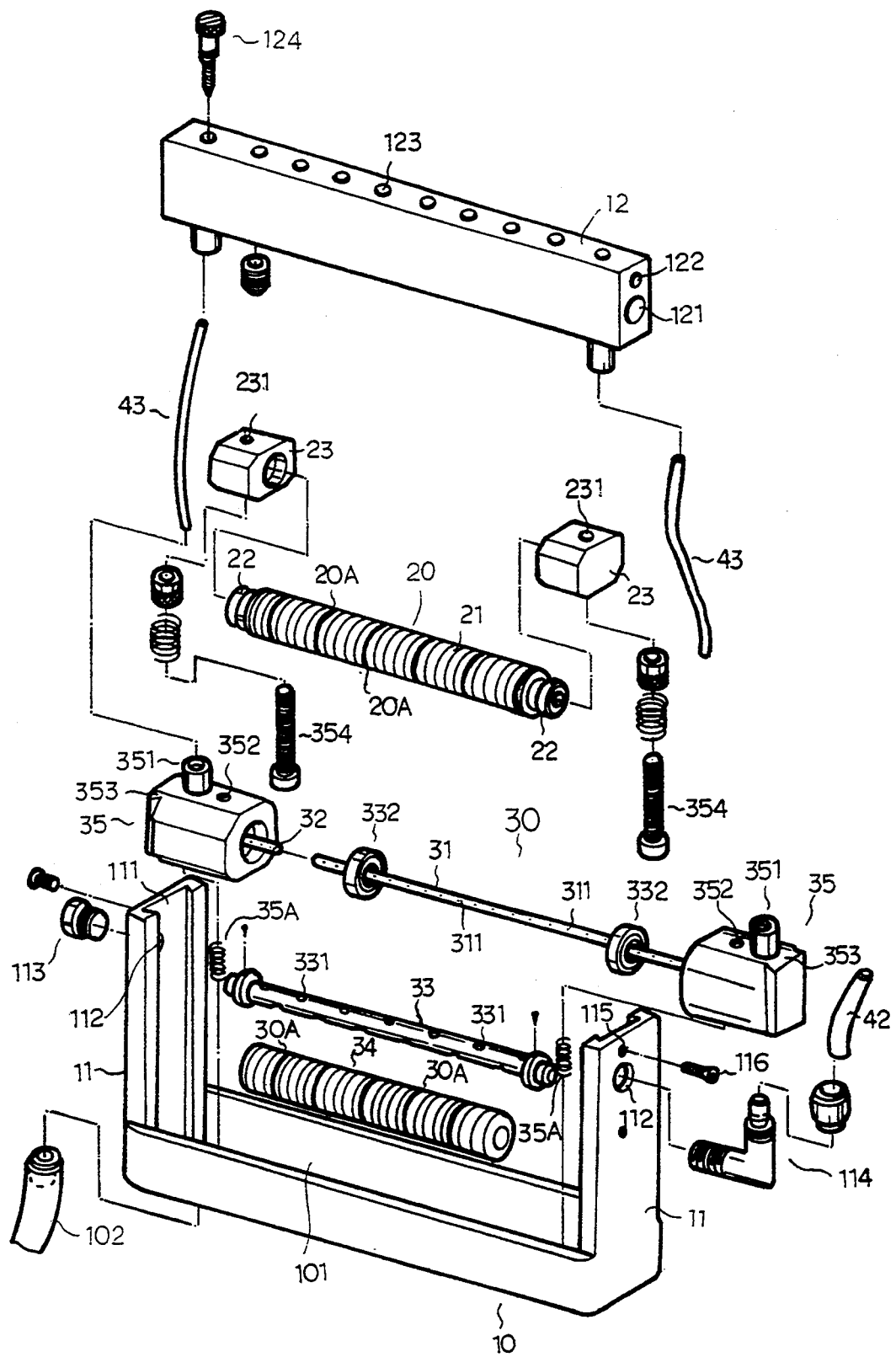
FIG. 1 is an exploded view of an adjustable double-roller oil feeder according to the preferred embodiment of the present invention.
Figure 2:
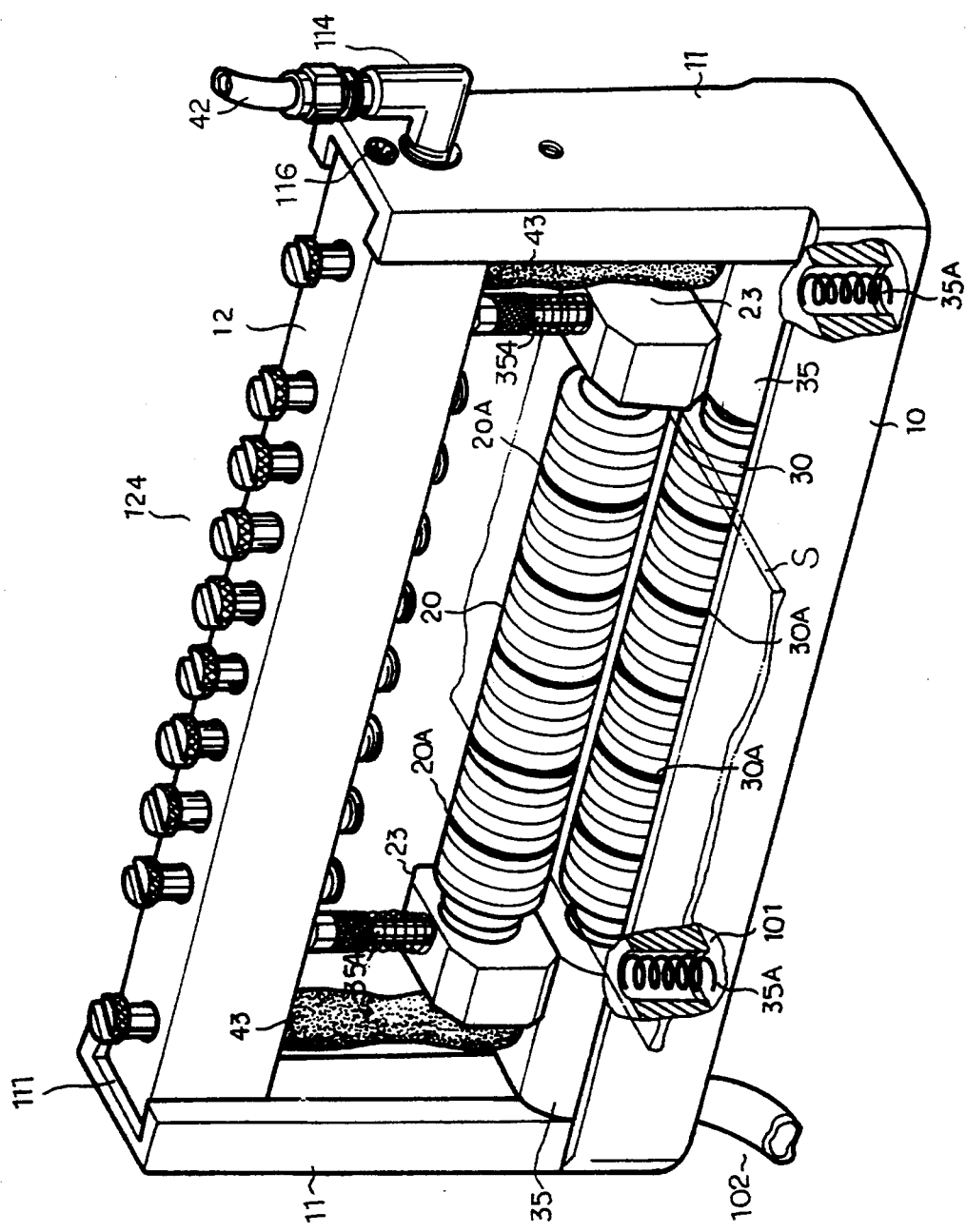
FIG. 2 is an elevational view of the adjustable double-roller oil feeder shown in FIG. 1.

Referring to FIGS. 1 and 2 the machine base of the adjustable double-roller oil feeder in accordance with the preferred embodiment of the present invention is generally comprised of a transverse bottom frame 10, two upright side frames 11; and a transverse top frame 12. A first roller 20 and a second roller 30 are transversely disposed between the top frame 12 and the bottom frame 10 at different elevations. The bottom frame 10 comprises a longitudinal trough 101, an oil drain tube 102 connected to one end of the longitudinal trough 101 at the bottom. The upright side frames 11 are perpendicularly connected to two opposite ends of the bottom frame 10, each having a longitudinal guide groove 111 on an inner side along the length, an oil inlet 112 near the top and fastened with a plug 113 or an oil intake pipe 114, and a mounting hole 115 above the oil inlet 112. The transverse top frame 12 comprises an oil guide hole 121 through two opposite ends thereof, two screw holes 122 on the two opposite ends thereof above the oil guide hole 121, and a series of equally spaced vertical oil drain holes 123 through the height and respectively intersecting the oil guide hole 121. The pitch between the screw hole 122 and the oil guide hole 121 is equal to the pitch between the mounting hole 115 and the oil inlet 112 on either upright side frame 11. The oil drain holes 123 are respectively fastened with a respective flow rate regulating valve 124. The two opposite ends of the transverse top frame 12 are respectively fitted into the guide groove 111 on either upright side frame 11 and moved to slide in the vertical direction. Screws 116 are respectively inserted through the mounting hole 115 on either upright side frame 11 and threaded into the screw hole 122 on either end of the transverse top frame 12 to fasten the transverse top frame 12 between the upright side frames 11. The plug 113 and the oil intake pipe 114 are then respectively inserted through the oil inlet hole 112 on either upright side frame 11 into either end of the oil guide hole 121. The first roller 20 is an elongated rod covered with a first covering layer 21 (made of felt or the like) having two bearings 22 on two opposite ends thereof mounted on a respective bearing block 23. The bearing block 23 has mounting hole 231 through the height. The second roller 30 is comprised of a master oil filling rod 31, an auxiliary oil filling rod 32, and a sleeve 33 to hold the master oil filling rod 31 and the auxiliary oil filling rod 32. The master oil filling rod 31 is a hollow tube having one end closed and an opposite end opened. A series of oil filling holes 311 are equally spaced on the master oil filling rod 31 along the length. The oil filling holes 311 are different in diameter. The ones which are disposed closer to the close end of the master oil filling rod 31 are relatively bigger than the ones which are disposed closer to the open end of the master oil filling rod 31. The auxiliary oil filling rod 32 is a hollow tube having two opposite ends opened. The master oil filling rod 31 and the auxiliary oil filling rod 32 are longitudinally aligned within the sleeve 33. The auxiliary oil filling rod 32 is spaced from the close end of the master oil filling rod 31. The sleeve 33 has oil holes 331 equally spaced along the length and alternatively arranged on two opposite sides and disposed perpendicular to one another, and is covered with a second covering layer 34. The two opposite ends of the sleeve 33 are mounted with a respective bearing 332 fastened to a respective bearing block 35. The bearing block 35 has an oil inlet 351, a top mounting hole 352, and an outer flange 353 fitted into the guide groove 111 on either upright side frame 11. The master oil filling rod 31 and the auxiliary oil filling rod 32 are respectively connected to the oil hole 351 on the respective bearing block 35 being fastened to either upright side frame 11. The bearing block 35 on either end of the sleeve 33 is fastened to the bearing block 23 on the corresponding end of the first roller 20 by connecting the respective mounting holes 352;231 together by a fastening device 354. Further, oil pipes 43 are respectively connected between the oil inlets 351 of the bearing blocks 35 of the second roller 30 and the two opposite ends of the oil guide hole 121 of the transverse top frame 12; two compression springs 35A are installed in the longitudinal trough 101 of the bottom frame 10 at two opposite locations to support the two bearing blocks 35 of the second roller 30 respectively.

Figure 3:
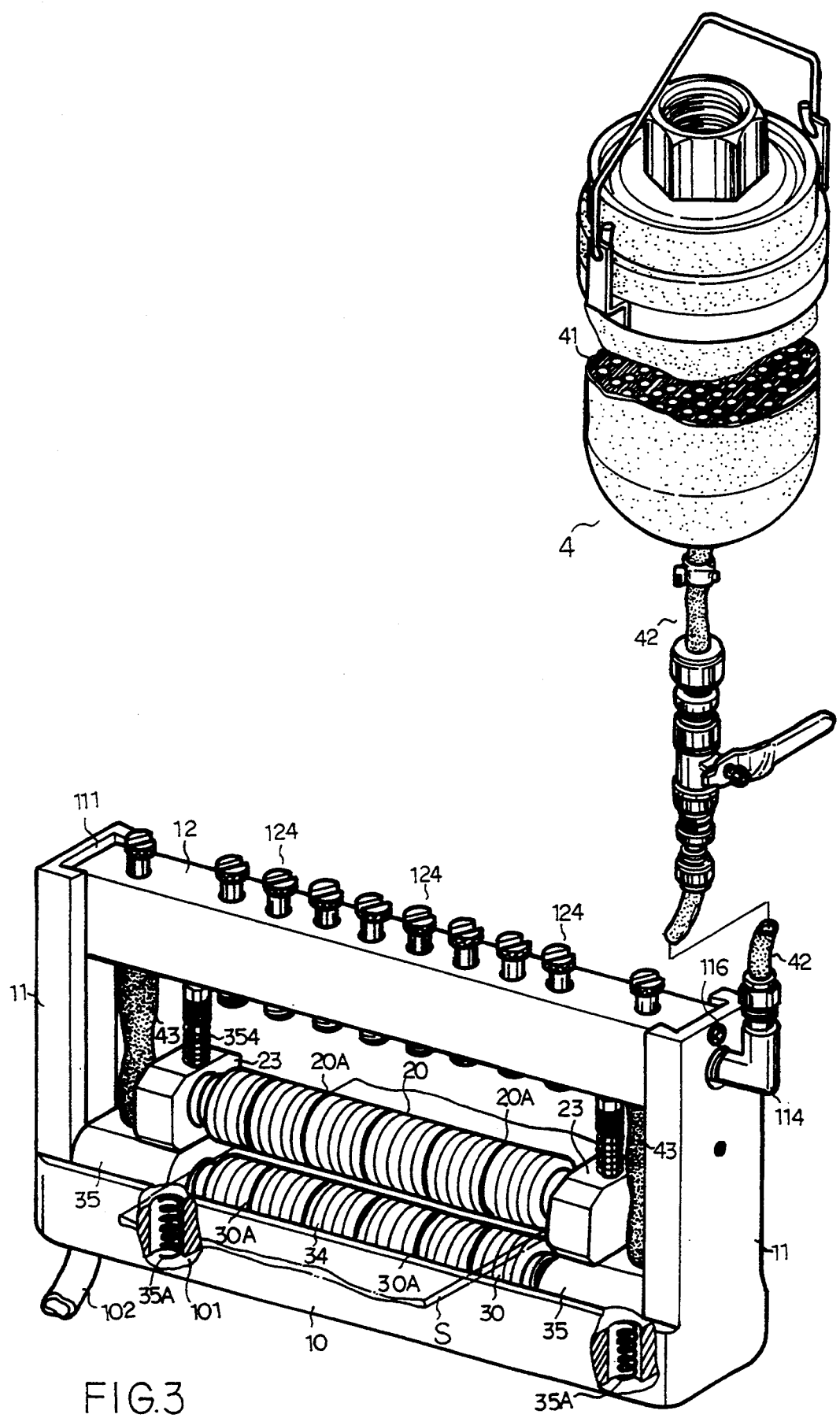
FIG. 3 is a broken view of an oil tank connected to adjustable double-roller oil feeder of FIG. 2.
Figure 4:
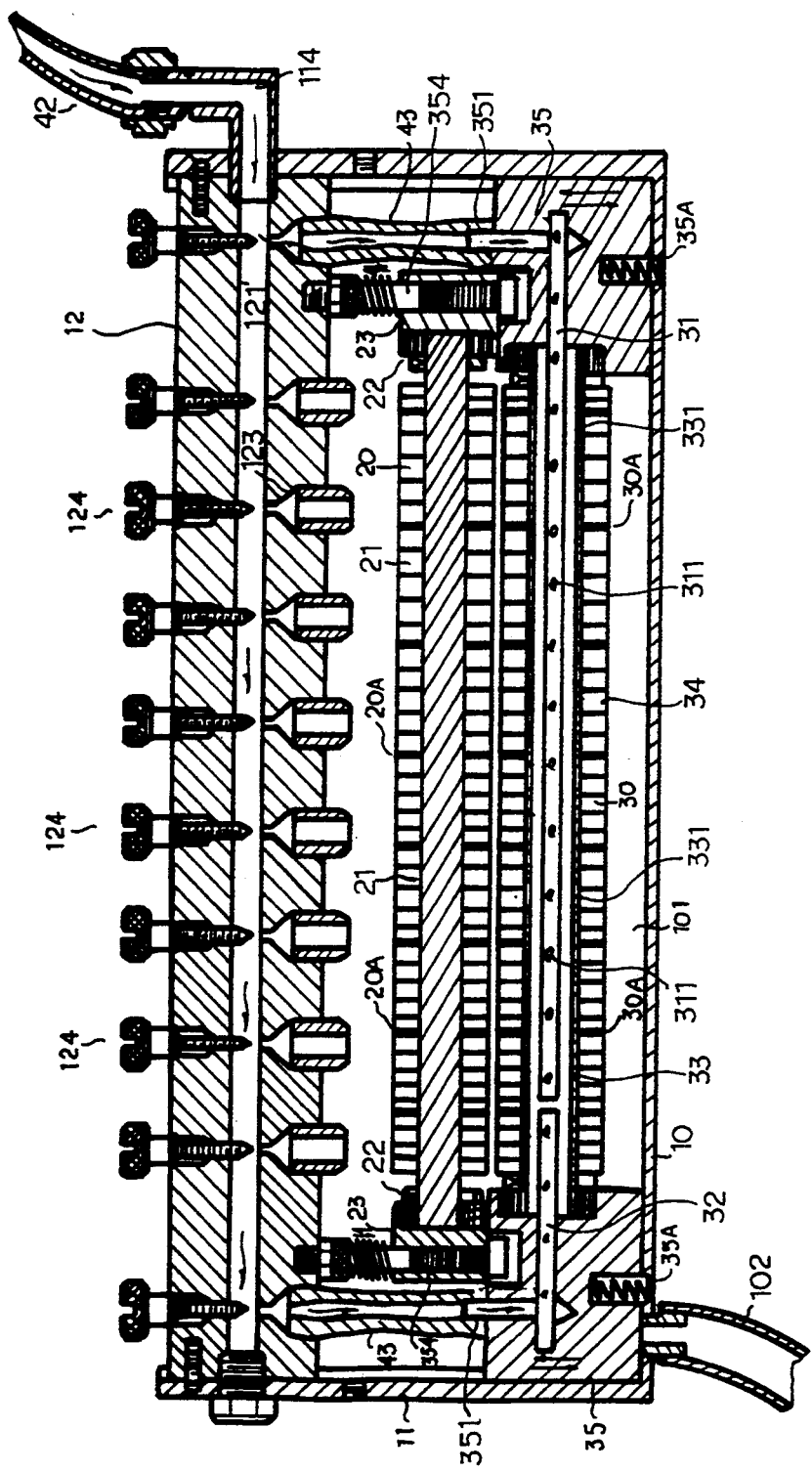
FIG. 4 is a longitudinal view in section of the adjustable double-roller oil feeder of FIG. 2.

Referring to FIGS. 3 and 4, a lubricating oil in an oil tank 4 is filtrated through a filter element 41 inside the oil tank 4, then delivered to the oil intake pipe 114 through an oil supply pipe 42, and then partially guided into the oil guide hole 121 and partially guided into the oil inlet 351 on either bearing block 35 of the second roller 30 through the oil pipes 43. The lubricating oil which is guided into the oil guide hole 121 flows out of the transverse top frame 12 through the oil drain holes 123 and drops to the covering layer 21 of the first roller 20. By means of the flow rate regulating valves 124, the oil flow rate through either oil drain hole 123 is respectively regulated. For example, the caliber of the oil drain holes 123 near the oil intake side may be reduced and the caliber of the oil drain holes 123 far from the oil intake side may be increased, so that the lubricating oil uniformly drops through the oil drain holes 123 to the first covering layer 21 for permitting the first covering layer 21 to be uniformly covered with the lubricating oil. At the same time, the lubricating oil which is guided to the master oil filling rod 31 of the second roller 30 flows out of the master oil filling rod 31 from the oil filling holes 311 thereof. As the caliber of the oil filling holes 311 is made gradually bigger from the open end of the master oil filling rod 31 to the close end thereof, the lubricating oil is uniformly guided out of the master oil filling rod 31. The lubricating oil which flows out of the master oil filling rod 31 adheres to the inside wall of the sleeve 33. Because the oil holes 331 are alternatively arranged on two opposite sides and disposed perpendicular to one another, the lubricating oil is uniformly guided out of the oil holes 331 as the sleeve 33 is turned during the operation of the oil feeder, and therefore the lubricating oil uniformly permeate the second covering layer 34.

Figure 5:
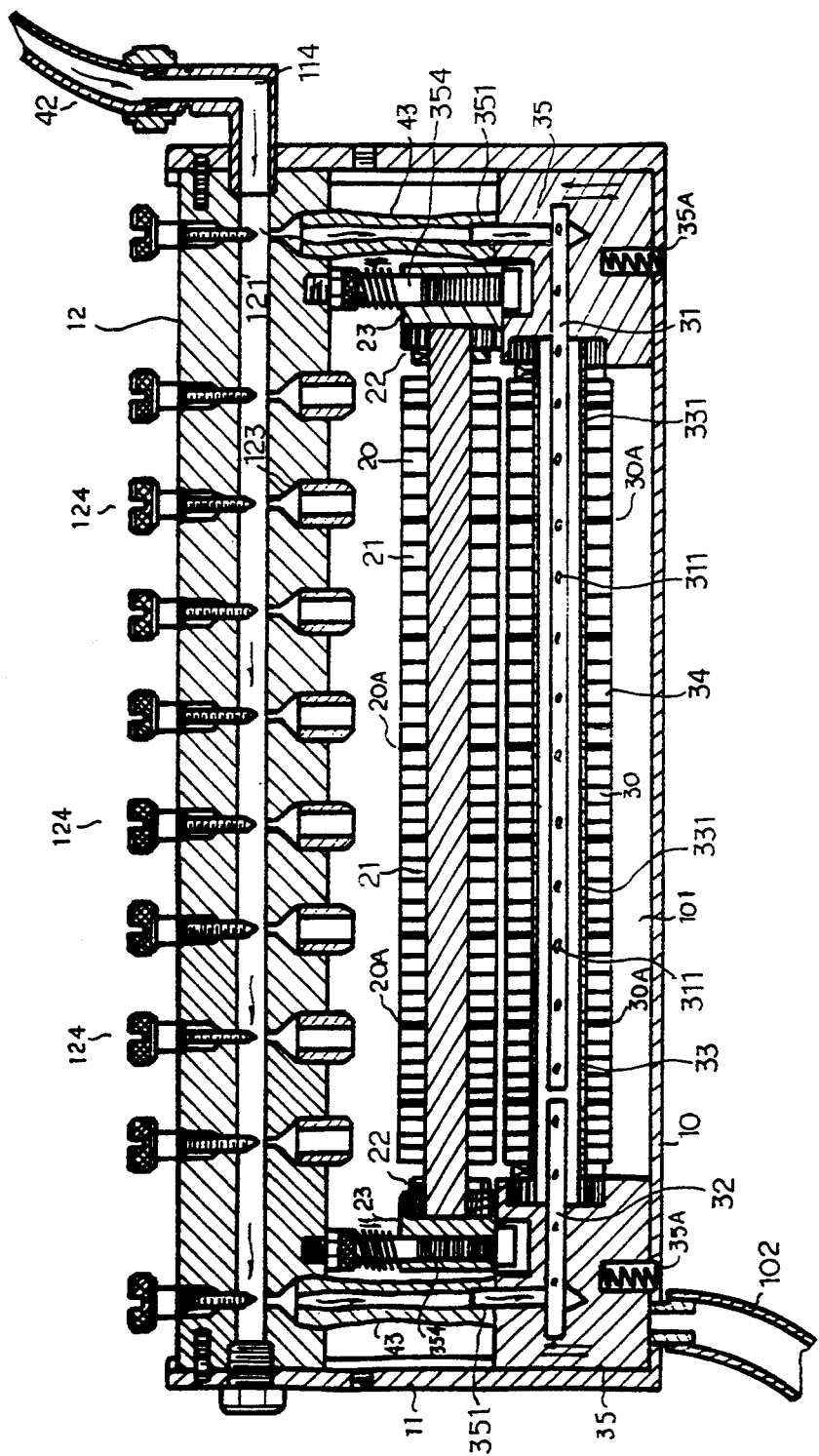
FIG. 5 is similar to FIG. 4 but showing the adjustable double-roller oil feeder tilted.

Referring to FIG. 5, the oil feeder may be disposed in a tilted position sloping toward the master oil filling rod 31 to meet the processing of different workpieces. In this case, the positions of the plugs 113 and the oil intake pipe 114 must be changed with each other for allowing the lubricating oil to be supplied to the auxiliary oil filling rod 32, and the flow rate regulating valves 124 are respectively regulated to adjust the caliber of the oil drain holes 123 in the reversed direction, namely, the caliber of the oil drain holes 123 is gradually increased from the auxiliary oil filling rod 32 toward the master oil filling rod 31. Therefore, the lubricating oil uniformly drops to the first covering layer 21. The lubricating oil which is guided into the second roller 30 is directly guided to the inside wall of the sleeve 33 by the auxiliary oil filling rod 32. As the sleeve 33 is turned round and round during the operation of the oil feeder, the lubricating oil is uniformly guided out of the oil holes 331 of the sleeve 33 to uniformly permeate the second covering layer 34.

Figure 6:
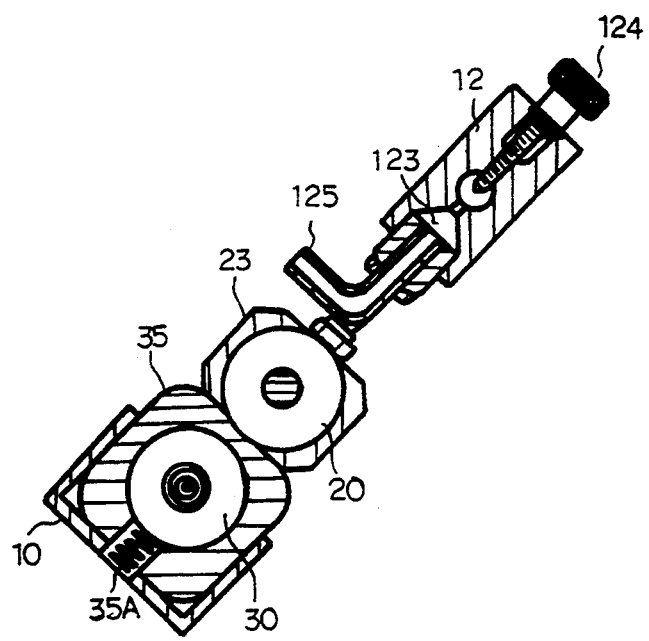
FIG. 6 is a side view in section showing the adjustable double-roller oil feeder of FIG. 2 disposed sloping backwards.
Figure 7:
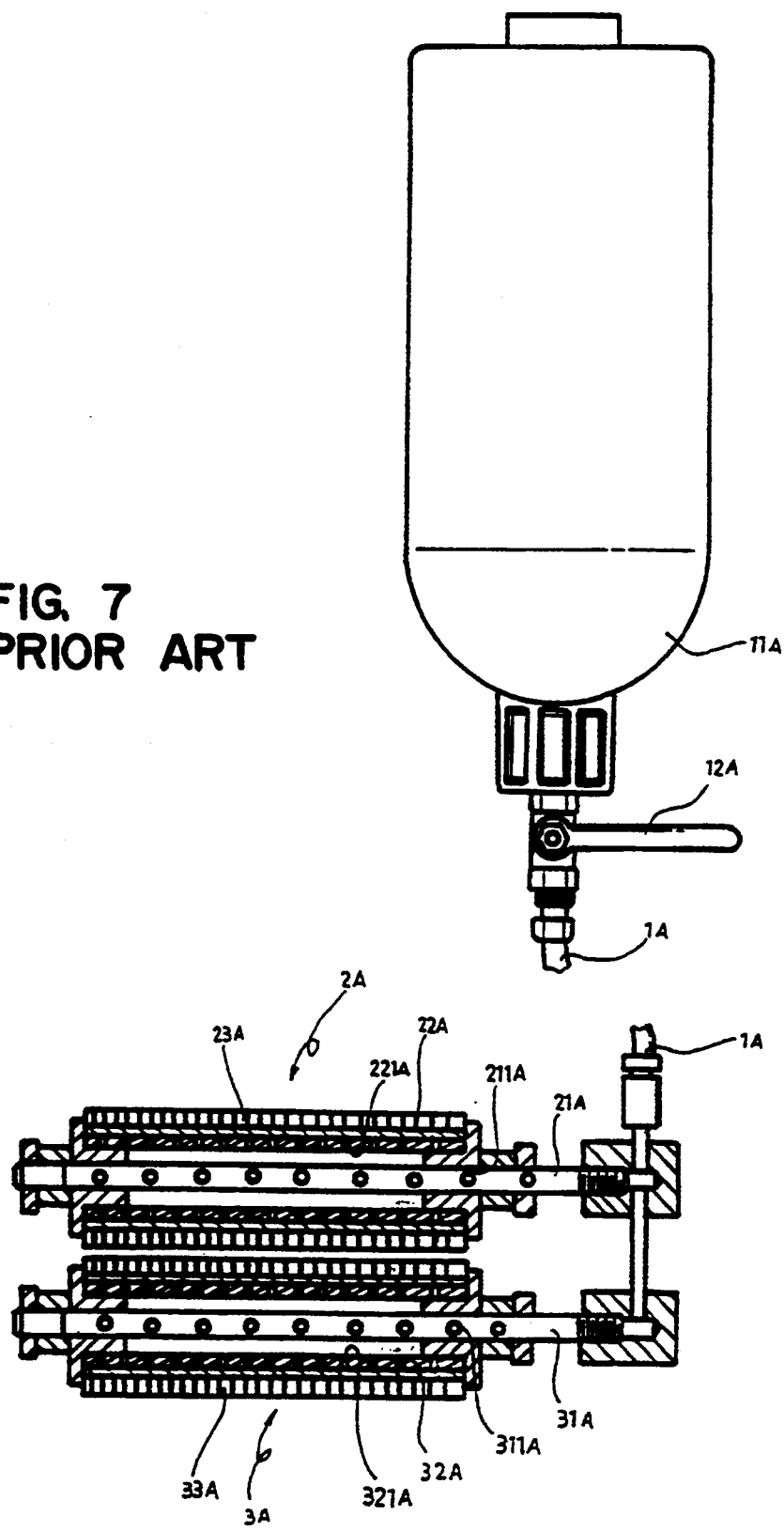
FIG. 7 is a sectional view of a double-roller oil feeder according to the prior art.

Referring to FIG. 6, each oil drain hole 123 of the transverse top frame 12 may be fastened with a respective curved oil guide tube 125 for guiding the lubricating oil to the first roller 20 as the oil feeder is disposed sloping backwards.

Referring to FIG. 3 again, as the workpiece S passes through the gap between the first roller 20 and the second roller 30, the shock waves are absorbed by the compression springs 35A. Therefore, the workpiece S is retained stable during the processing, and the second roller 30 will not be squeezed to deform. Furthermore, friction rings 20A;30A are respectively mounted around the first and second rollers 20;30 to protect the first and second covering layers 21;34, so as to prolong the service life of the first and second rollers 20;30.

What is claimed is:

1. An adjustable double-roller oil feeder connecting to an oil tank, comprising:

a bottom frame having a longitudinal trough;

two side frames each having a longitudinal guide groove on an inner side, a bottom end of each of the side frames being vertically mounted on each end of the bottom frame, one of the side frames having an oil inlet, the other one of the side frames having plug means, the oil inlet retaining an oil intake pipe for conducting oil from the oil tank;

a top frame, disposed between the oil inlet and the plug means of the side frames, having means for guiding the oil from the oil intake pipe, the guiding means including a longitudinal passage and a plurality of vertical oil drain holes, the oil drain holes vertically passing through the longitudinal passage so that the oil flows from the oil inlet to the oil drain holes through the longitudinal passage, each of the oil drain holes having one end receiving valve means for regulating an oil flow rate in the longitudinal passage and the other end of each of the oil drain holes being open to the bottom frame for draining the oil toward the bottom frame, wherein the oil drain holes are spaced along the longitudinal passage;

first roller means for feeding oil on a workpiece being disposed between the top and bottom frames and between the two side frames, the first roller means including an elongated rod covered with a first covering layer, the oil draining on the first covering layer through the oil drain holes;

first bearing means for mounting the first roller means on the side frames being disposed between each end of the first roller means and the guide groove of the side frames, the first bearing means including two first bearings and two first bearing blocks;

second roller means for feeding oil on the workpiece, the second roller means being disposed between the first roller means and the bottom frame and between the two side frames, the second roller means including a first oil filling rod and a second oil filling rod, each of the first and second oil filling rods having a hollow oil passage and a plurality of vertical oil filling holes passing through the hollow oil passage, the oil filling holes of the first and second oil filling rod having different diameters, the diameters of the filling holes of the first oil filling rod near the oil inlet being smaller than that of the filling holes of the first oil filling rod far from the oil inlet, the first oil filling rod being longer than the second oil filling rod, the first oil filling rod being axially aligned to the second oil rod, wherein one end of the first oil filling rod near the oil inlet is open and the opposite end of the first oil filling rod is closed, both ends of the second oil filling rod are open, the second end of the first oil filling rod being spaced from one end of the second oil filling rod which is near the first oil filling rod, the second roller means further including a sleeve member concentrically disposed over the first and second oil filling rods, the sleeve member having a plurality of oil draining holes, the oil draining holes of the sleeve member being spaced along the sleeve member, the second roller means further including a second covering layer concentrically disposed over of the sleeve member, the oil from the first and second oil filling rods draining to the sleeve member which further permeates through the second covering layer so as to feed the oil to the workpiece;

second bearing means for mounting the second roller means on the side frames being disposed between each end of the second roller means and the guide groove of the side frames, the second bearing means including two second bearings and two second bearing blocks, the first and second bearing blocks having means for receiving the first oil filling rod and the second oil filling rod, respectively; the second bearing means being mounted to the first bearing means by mounting means;

oil pipe means for draining the oil from the top frame to the first and second oil filling rods interconnecting the first and second bearing blocks to the top frame; and wherein the first and second roller means feed the oil to the workpiece when the workpiece passes through a space defined between the first and second roller means, the first and second covering layers are uniformly covered with the oil so that the workpiece is uniformly covered with the oil.

2. An adjustable double-roller oil feeder in accordance with claim 1, wherein each of the oil drain holes of the top frame is fastened by an outlet pipe means opposite to the valve means, the outlet pipe means draining oil from the top frame to the first roller means, the outlet pipe means including a curved oil guide tube so that the oil is able to be uniformly fed when the oil feeder is disposed sloping backwards.

3. An adjustable double-roller oil feeder in accordance with claim 1, wherein the first and second covering layers are made of a resilient material so that the workpiece is not worn out by a frictional force created by the workpiece while passing through the space defined between the first and second roller means.

4. An adjustable double-roller oil feeder in accordance with claim 1, wherein a plurality of friction rings are mounted around the first and second covering layers, the friction rings are made of a resilient material so that the workpiece is not worn out by a frictional force created by the workpiece while passing through the space defined between the first and second roller means.

5. An adjustable double-roller oil feeder in accordance with claim 3, wherein a plurality of friction rings are mounted around the first and second covering layers, the friction rings are made of a resilient material so that the frictional force is further eliminated when the workpiece passes through the space defined between the first and second roller means.

6. An adjustable double-roller oil feeder in accordance with claim 1, further comprising spring means disposed in the longitudinal trough of the bottom frame below the second bearing means so that shock waves are absorbed when the workpiece passes through the space defined between the first and second roller means.

7. An oil feeder connecting to an oil tank, comprising:
a frame having a bottom frame, a top frame, and two side frames;
roller means disposed in the frame including first and second roller means;
first and second bearing means for respectively mounting two ends of the first and second roller means in an inner side of each of the side frames, the first bearing means being mounted on the second bearing means;
oil intaking means for filling oil from the oil tank to the top frame;
oil guiding means disposed in the top frame for guiding the oil from the oil intaking means to the first roller means;
valve means disposed on the top frame for regulating an oil flow in the oil guiding means;
oil pipe means for draining the oil from the top frame to the second roller means interconnecting the top frame to the second bearing means;
the first roller means including a first covering layer;
the second roller means including first and second oil filling rods which are spaced from each other, the first oil filling rod being axially aligned with the second oil filling rod, sleeve means concentrically disposed over the first and second oil filling rods, and a second covering layer concentrically disposed over the sleeve means; and
means for uniformly distributing oil in the second roller means, the distributing means including a plurality of oil filling holes on the first and second oil filling rods and a plurality of oil filling holes on the sleeve means, each oil filling hole of the first oil filling rod having a different diameter so that the oil distribution from the first oil filling rod is equal, a workpiece being uniformly covered by the oil when the workpiece passes through a space defined between the first and second roller means.

8. An oil feeder in accordance with claim 7, wherein the guiding means of the top frame includes a longitudinal passage and a plurality of oil draining holes, the plurality of oil draining holes vertically passing through the longitudinal passage so that the oil flows from the oil intaking means to the oil draining holes through the longitudinal passage.

* * * * *